F. PLUMMER.
Seed Planter.
No. 14,144.
Patented Jan. 22, 1856.
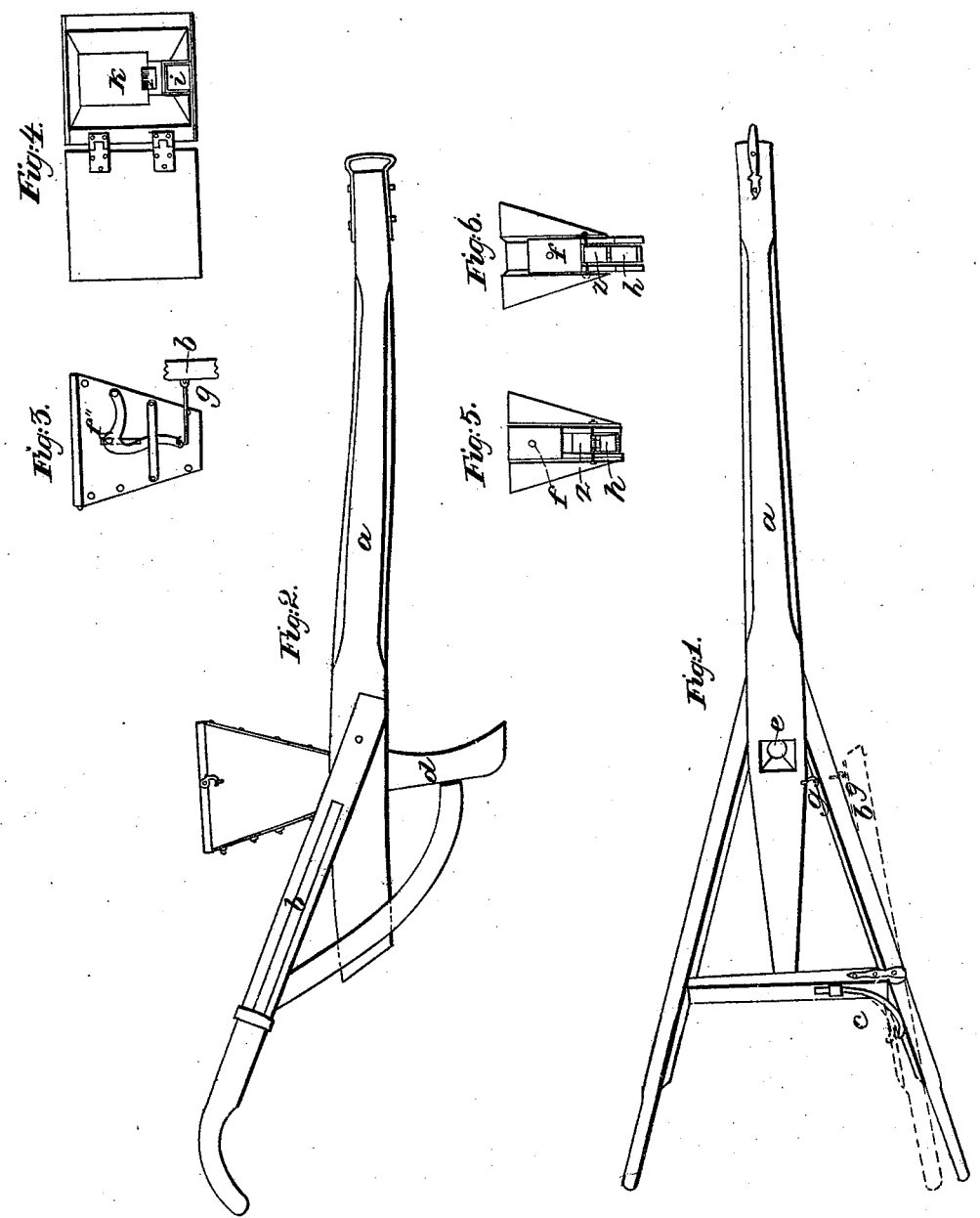

UNITED STATES PATENT OFFICE.

F. PLUMMER, OF MANCHESTER, INDIANA.

IMPROVEMENT IN SEED-PLANTERS.

Specification forming part of Letters Patent No. 14,144, dated January 22, 1856.

*To all whom it may concern:*

Be it known that I, FREEMAN PLUMMER, of Manchester, in the county of Dearborn and State of Indiana, have invented a new and Improved Machine for Planting Corn and other Seed; and I do hereby declare that the following is a full and exact description thereof, reference being had to the accompanying drawings, and to the letters of reference marked thereon.

My improvement consists in devices whereby the measuring and dropping of the seed are effected with great certainty and regularity.

Figure 1 is a top view of the machine, as shown when the vibrating handle is drawn to a point to cause a discharge of seed from the cup as measured and struck off. Fig. 2 is a side view of the same with the said handle in a position as shown when the seed cup is filling.

To beam $a$, at or near the rear end, are placed the handles, of which $b$ represents the one referred to in the above Figs. 1 and 2. This handle is formed of two pieces, the lower containing a long mortise to receive a tenon, which tenon is formed on the lower end of the upper piece of said handle, the two pieces being pivoted together at or near two-thirds their distance from the beam. The object of this arrangement is to enable the one who may be operating with the machine to control the dropping at will.

$c$ is a spring so formed and arranged as to hold the said handle in a position as shown in Fig. 2 when not discharging.

$d$ is the usual hollow fluke, which conducts the seed from the beam to the ground, and also causes the covering in the usual manner by allowing the soil to fill in after it.

$e$ is a hole through the beam, through which the seed passes. $f$ is a slide constructed with a long slot, extending from the upper part of the seed-cup $z$ to the lower end of said slide, which slot is for the purpose of receiving a hinge, $h$, which hinge is inserted in the said slot and pivoted at the lower end at the back part of the projecting sides that form the said slot, and at the upper end hinged to the side of the hopper. By this arrangement the seed-cup $z$ is formed in the upper part of said slot by setting the aforesaid hinge so as to form an elbow, the upper part of which, when in this position forms a bottom to the aforesaid cup $z$. When wishing to drop the aforesaid slide is drawn down by means heretofore described, at which time the cup $z$ is drawn below the hopper-bottom, bringing a solid portion of the aforesaid slide opposite the point at which the seed-cup $z$ is formed and filled. When in this position the hinge $h$ is drawn straight, allowing a discharge of seed thus measured.

$g$ is a rod for connecting the curved lever $j$ and handle $b$. $i$ is the top of the conductor that receives the slide $f$.

$f''$ is a curved lever; when drawn by handle $b$ forces the slide $f$ downward.

$k$ is the bottom of the hopper, with a brush inserted, that in case of a jam will save the parts from fracture.

Fig. 3 is a detached view of the back side of the hopper, showing the connections of $i, f''$, $g$, and $b$. Fig. 4 is a top view of the hopper and seed-cup $z$ when open. Fig. 5 is a detached view of the back part of conductor $i$ containing the seed-cup $z$, as shown filling. Fig. 6 is a detached view of the same as discharging.

I claim as new and of my invention and desire to secure by Letters Patent—

The seed-cup $z$, as formed by slide $f$, conductor $i$, and hinge $h$, as herein described.

FREEMAN PLUMMER.

Witnesses:
   G. H. LOZIER,
   GEO. L. CURTISS.